United States Patent
Liu et al.

(10) Patent No.: US 12,087,056 B2
(45) Date of Patent: Sep. 10, 2024

(54) VIDEO GENERATION METHOD AND APPARATUS, AND PROMOTIONAL VIDEO GENERATION METHOD AND APPARATUS

(71) Applicant: Alibaba (China) Co., Ltd., Hangzhou (CN)

(72) Inventors: Xikai Liu, Hangzhou (CN); Xing Gao, Hangzhou (CN)

(73) Assignee: Alibaba (China) Co., Ltd., Zheji (CN)

( * ) Notice: Subject to any disclaimer, the term of this patent is extended or adjusted under 35 U.S.C. 154(b) by 0 days.

(21) Appl. No.: 17/691,988

(22) Filed: Mar. 10, 2022

(65) Prior Publication Data
US 2022/0301307 A1 Sep. 22, 2022

(51) Int. Cl.
| | |
|---|---|
| G06V 20/40 | (2022.01) |
| G06N 3/045 | (2023.01) |
| G06N 3/08 | (2023.01) |
| G06Q 30/0241 | (2023.01) |
| G06V 10/25 | (2022.01) |
| G06V 30/32 | (2022.01) |

(52) U.S. Cl.
CPC ............ *G06V 20/41* (2022.01); *G06N 3/045* (2023.01); *G06N 3/08* (2013.01); *G06Q 30/0276* (2013.01); *G06V 10/25* (2022.01); *G06V 20/46* (2022.01); *G06V 30/32* (2022.01); *G06V 2201/07* (2022.01)

(58) Field of Classification Search
CPC ........ G06V 20/41; G06V 10/25; G06V 20/46; G06V 30/32; G06V 2201/07; G06N 3/0454; G06N 3/08; G06Q 30/0276
See application file for complete search history.

(56) References Cited

U.S. PATENT DOCUMENTS

| | | | | |
|---|---|---|---|---|
| 6,130,676 | A | * 10/2000 | Wise ....................... | G06T 11/60 |
| | | | | 345/619 |
| 11,521,018 | B1 | * 12/2022 | Barzelay ................. | G06T 11/60 |

(Continued)

FOREIGN PATENT DOCUMENTS

CN 202110305312.3 * 10/2022 ............... G06N 3/08

OTHER PUBLICATIONS

Pengyuan Lyu, Distinguishing Text/Non-Text Natural Images with Multi-Dimensional Recurrent Neural Networks, 2016 23rd International Conference on Pattern Recognition (Year: 2016).*

(Continued)

*Primary Examiner* — Arthur Duran
(74) *Attorney, Agent, or Firm* — Lee & Hayes, P.C.

(57) ABSTRACT

A video generation method and apparatus, and a promotional video generation method and apparatus are disclosed. The video generation method includes: obtaining a plurality of original files, each of the plurality of original files includes at least one subject matter; extracting multiple subject matters and labeling information corresponding to the multiple subject matters from the plurality of original files; establishing a display structure corresponding to the multiple subject matters based on the labeling information; and combining the multiple subject matters using the display structure to generate a target video. The present disclosure solves the technical problems of difficulties in automatic reconstruction and generation of video data from a product detail page in existing technologies.

12 Claims, 9 Drawing Sheets

(56) References Cited

U.S. PATENT DOCUMENTS

| | | | |
|---|---|---|---|
| 2003/0031260 A1* | 2/2003 | Tabatabai | H04N 21/234318 375/E7.021 |
| 2010/0095236 A1* | 4/2010 | Silberstein | G06T 13/00 715/781 |
| 2010/0281055 A1* | 11/2010 | Choi | G06F 16/217 707/E17.014 |
| 2014/0328570 A1* | 11/2014 | Cheng | H04N 21/8549 386/241 |
| 2015/0103079 A1* | 4/2015 | Khambanonda | G06T 11/60 345/441 |
| 2015/0220492 A1* | 8/2015 | Simeonov | G06F 16/972 715/244 |
| 2017/0062009 A1* | 3/2017 | Clifton | G11B 27/031 |
| 2017/0206684 A1* | 7/2017 | Duncker | G06F 40/143 |
| 2017/0289617 A1* | 10/2017 | Song | H04N 21/4666 |
| 2018/0020243 A1* | 1/2018 | Ni | H04N 21/23418 |
| 2018/0046708 A1* | 2/2018 | Stewart | G06V 10/762 |
| 2018/0089161 A1* | 3/2018 | Nguyen | G06F 40/18 |
| 2019/0034976 A1* | 1/2019 | Hamedi | G06Q 30/0243 |
| 2019/0056856 A1* | 2/2019 | Simmons | G06F 3/017 |
| 2019/0200064 A1* | 6/2019 | Louis | G06F 40/289 |
| 2021/0058582 A1* | 2/2021 | Aubie | H04N 21/440263 |
| 2021/0105340 A1* | 4/2021 | Grozdanov | G06F 8/76 |
| 2021/0174197 A1* | 6/2021 | Georgis | G06N 20/20 |
| 2021/0240913 A1* | 8/2021 | Jiang | G06F 40/151 |
| 2021/0272599 A1* | 9/2021 | Patterson | G06N 3/045 |
| 2021/0279840 A1* | 9/2021 | Chi | G06T 3/40 |
| 2021/0289265 A1* | 9/2021 | Armstrong | H04N 21/47202 |
| 2021/0366099 A1* | 11/2021 | Liao | G06F 40/216 |
| 2022/0004875 A1* | 1/2022 | Koike-Akino | G06N 3/082 |
| 2022/0100788 A1* | 3/2022 | Chan | G06F 16/41 |
| 2022/0108727 A1* | 4/2022 | van Welzen | G11B 27/036 |
| 2022/0122301 A1* | 4/2022 | Gehlaut | G06T 7/13 |
| 2022/0318497 A1* | 10/2022 | Chalabi | G06N 20/00 |
| 2022/0417618 A1* | 12/2022 | Kamo | H04N 21/854 |
| 2023/0154627 A1* | 5/2023 | Irving | G06N 3/0455 706/20 |

OTHER PUBLICATIONS

Asghar Ali, A Hybrid Deep Neural Network for Urdu Text Recognition in Natural Images, 2019 IEEE 4th International Conference (Year: 2019).*

* cited by examiner

VIDEO GENERATION METHOD AND APPARATUS, AND PROMOTIONAL VIDEO GENERATION METHOD AND APPARATUS

CROSS REFERENCE TO RELATED PATENT APPLICATIONS

This application claims priority to Chinese Patent Application No. 202110305312.3, filed on 19 Mar. 2021 and entitled "Video Generation Method and Apparatus, and Promotional Video Generation Method and Apparatus," which is hereby incorporated by reference in its entirety.

TECHNICAL FIELD

The present disclosure relates to the field of video processing technology, and in particular, to video generation methods and apparatuses, and promotional video generation methods and apparatuses.

BACKGROUND

In related technologies, traditional target detection methods and layout analysis methods are often used in reconstruction of picture and text documents on product detail pages. However, traditional target detection methods require a large amount of data labeling to detect a precise object (such as a cat, a dog). However, for such task, a large number of different types of objects exist in a product detail page, and different products have different characteristics. It is difficult to label them one by one and perform training for, which will consume a lot of manpower and cannot cover all possible situations well. Traditional layout analysis methods are mainly used for performing an analysis in well-structured images such as papers or newspapers, etc. These methods learn characteristics of a certain type of printed text and layout characteristics of newspapers and periodicals for performing a layout analysis. However, such methods cannot be used to analyze relatively complicated and irregular layout situations, such as those in product detail pages. The complicated background color and the large number of pictures and texts of different styles will make these methods fail to accurately learn the characteristics.

As known by analysis, existing technologies as described above mainly have the following unresolved problems, which make them difficult to automatically reconstruct product detail pages to generate video data: 1) The product detail pages have complex structures and relatively messy layouts, making it difficult to identify information, such as precise pictures, texts, and tables, etc., for locating target positions; 2) Traditional layout analysis methods cannot solve the problems of sequential reconstruction and logical analysis in irregular data.

In view of the above-mentioned problems, no effective solutions have yet been proposed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/ computer readable instructions as permitted by the context above and throughout the present disclosure.

Embodiments of the present disclosure provide a method and an apparatus for generating a video, and a method and an apparatus for generating a promotional video, so as to at least solve the technical difficulties of automatically reconstructing a product detail page to generate video data in the existing technologies.

According to the embodiments of the present disclosure, a video generation method is provided, which includes: obtaining a plurality of original files, each of the plurality of original files includes at least one subject matter; extracting multiple subject matters and labeling information corresponding to the multiple subject matters from the plurality of original files; establishing a display structure corresponding to the multiple subject matters based on the labeling information; and combining the multiple subject matters using the display structure to generate a target video.

According to the embodiments of the present disclosure, a method for generating a promotional video is also provided, which includes: obtaining a plurality of promotional original files, wherein each of the plurality of promotional original files includes: at least one promotional subject matter; extracting multiple promotional subject matters and labeling information corresponding to the multiple promotional subject matters from the plurality of promotional original files; establishing a display structure corresponding to the multiple promotional subject matters based on the labeling information; and combining the multiple promotional subject matters using the display structure to generate a promotional video.

According to the embodiments of the present disclosure, a non-volatile storage medium is also provided. The non-volatile storage medium includes a stored program, wherein the program, when running, controls a device in which the non-volatile storage medium is located to execute the video generation method and the promotional video generation method as described above.

According to the embodiments of the present disclosure, an electronic device is also provided, which includes: a processor; and a memory connected to the processor and configured to provide the processor with instructions for processing the following processing steps: obtaining a plurality of original files, each of the original files includes at least one subject matter; extracting multiple subject matters and labeling information corresponding to the multiple subject matters from the plurality of original files; establishing a display structure corresponding to the multiple subject matters based on the labeling information; and combining the multiple subject matters using the display structure to generate a target video.

In the embodiments of the present disclosure, multiple original files area obtained, each of the original files includes at least one subject matter. Multiple subject matters and labeling information corresponding to the foregoing multiple subject matters are extracted from the multiple original files. Based on the labeling information, a display structure corresponding to the multiple subject matters is established. Using the display structure, the multiple subject matters are combined to generate a target video.

The solutions of the present disclosure employ picture and text information of a product detail page to reconstruct a file to generate a short video. First, each original file in multiple original files is obtained, and multiple subject matters and labeling information corresponding to the multiple subject matters are extracted from the multiple original files. A corresponding display order of each subject matter is determined based on the labeling information, and an image processing method is then used to combine the multiple subject matters based on the display order to generate a short video.

Therefore, the embodiments of the present disclosure achieve the purpose of automatically reconstructing and generating video data based on graphic subject matters, thereby achieving a richer three-dimensional display of a product, enhancing the technical effects of user experience, and solving the technical problems of the difficulties in automatic reconstruction and generation of video data from a product detail page in the existing technologies.

BRIEF DESCRIPTION OF THE DRAWINGS

Drawings described herein are used to provide a further understanding of the present disclosure and constitute a part of the present disclosure. Exemplary embodiments of the present disclosure and descriptions thereof are used to explain the present disclosure, and do not constitute an improper limitation of the present disclosure. In the accompanying drawings.

DETAILED DESCRIPTION

Figure 1:
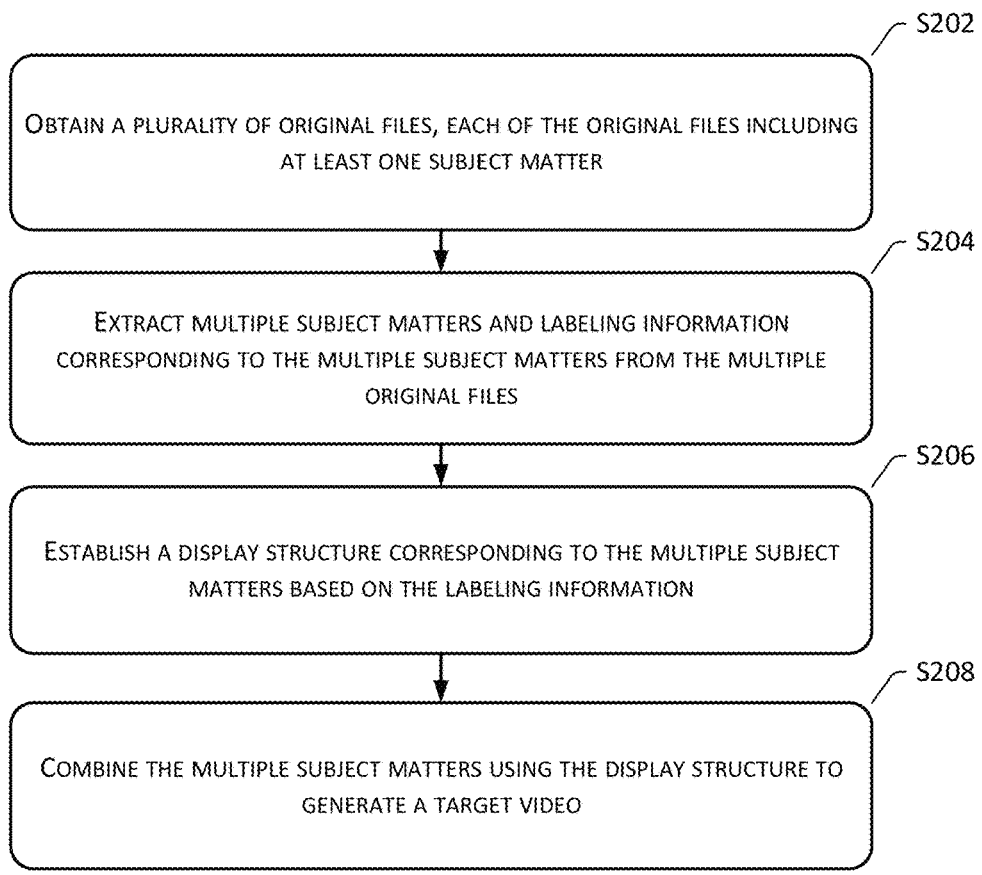
FIG. 1 is a flowchart of a video generation method according to the embodiments of the present disclosure.

In order to enable one skilled in the art to better understand the solutions of the present disclosure, the technical solutions in the embodiments of the present disclosure will be clearly and completely described below in conjunction with the drawings in the embodiments of the present disclosure. Apparently, the described embodiments represent only some and not all of the embodiments of the present disclosure. Based on the embodiments in the present disclosure, all other embodiments obtained by one of ordinary skill in the art without making any creative effort should fall within the scope of protection of the present disclosure.

It should be noted that terms, such as "first" and "second", etc., in the specification and claims of the present disclosure and the drawings are used to distinguish similar objects, and are not necessarily used to describe a specific sequence or an order of precedence. It should be understood that data used in this way may be interchanged under appropriate circumstances, so that the embodiments of the present disclosure described herein may be implemented in an order different from those illustrated or described herein. In addition, terms such as "including" and "having" and any variations thereof are intended to cover a non-exclusive inclusion. For example, a process, method, system, product, or device that includes a series of steps or units is not necessarily limited to those that are explicitly listed, but may include other steps or units that are not explicitly listed or are inherent to such process, method, product, or device.

First, some nouns or terms appearing in a process of describing the embodiments of the present disclosure are applicable to the following explanations:

Picture and text reconstruction: that is, a reconstruction of picture and text documents, which refers to performing a structured reconstruction of pictures of an unstructured product detail page through graphic layout analysis, graphic element relationship recognition and a reading order, and obtaining an order sequence of sub-elements according to ordering.

Deep target detection model: a model that automatically detects target entities from pictures using deep learning technology.

Region of Interest (ROI): an area that needs to be processed and outlined in a box or circle, etc., from a processed image in image processing.

Optical Character Recognition (OCR): a process of determining shape of characters by detecting dark and bright patterns and translating the shapes into computer characters.

Layout analysis: that is, a composition analysis, which refers to a process of analyzing multiple sub-elemental subject matters (pictures, text, tables) in a picture and storing them as a graph structure.

Multi-modality: refers to the ability of using multiple technologies and algorithms to comprehensively process data from multiple modalities (such as text, voice, image, etc.).

According to the embodiments of the present disclosure, an example video generation method is provided. It should be noted that steps shown in a flowchart of an accompanying drawing may be executed in a computer system such as a set of computer-executable instructions. Furthermore, although a logical sequence is shown in a flowchart, but in some cases, steps may be performed in a different order than those shown or described herein.

The present disclosure provides a video generation method as shown in FIG. 1. FIG. 1 is a flowchart of a video generation method 200 according to the embodiments of the present disclosure. As shown in FIG. 1, the video generation method 200 includes the following method steps:

Step S202: Obtain a plurality of original files, each of the original files including at least one subject matter.

Step S204: Extract multiple subject matters and labeling information corresponding to the multiple subject matters from the multiple original files.

Step S206: Establish a display structure corresponding to the multiple subject matters based on the labeling information.

Step S208: Combine the multiple subject matters using the display structure to generate a target video.

In the embodiments of the present disclosure, multiple original files area obtained, each of the original files includes at least one subject matter. Multiple subject matters and labeling information corresponding to the foregoing multiple subject matters are extracted from the multiple original files. Based on the labeling information, a display structure corresponding to the multiple subject matters is established.

Using the display structure, the multiple subject matters are combined to generate a target video.

The solutions of the present disclosure employ picture and text information of a product detail page to reconstruct a file to generate a short video. First, each original file in multiple original files is obtained, and multiple subject matters and labeling information corresponding to the multiple subject matters are extracted from the multiple original files. A corresponding display order of each subject matter is determined based on the labeling information, and an image processing method is then used to combine the multiple subject matters based on the display order to generate a short video.

Therefore, the embodiments of the present disclosure achieve the purpose of automatically reconstructing and generating video data based on picture and text subject matters, thereby achieving a richer three-dimensional display of a product, enhancing the technical effects of user experience, and solving the technical problems of the difficulties in automatic reconstruction and generation of video data from a product detail page in the existing technologies.

In the embodiments of the present disclosure, the original files may be exhibited item files, promotional item files, product files, etc., for example, a product file containing product detail page pictures. The multiple subject matters may be picture subject matters, picture-text subject matters, and text subject matters.

In the embodiments of the present disclosure, the labeling information is used to label a subject matter type of each subject matter. For example, a label may be used for labeling. Based on the labeling information, a display structure corresponding to the multiple subject matters may be established. The display result may be a graph structure having hierarchical and ordering information, that is, an ordering structure used for picture and text reconstruction. The display structure may be used to combine the multiple subject matters to generate a target video.

It should be noted that the video generation method provided by the embodiments of the present disclosure may be, but is not limited to, applied to a virtual human live broadcast scenario, for example, a commodity display scenario in a process of virtual host live broadcasting, a virtual host live broadcast marketing scenario, and may also be extended to be used in a live broadcast e-commerce scenario.

In the embodiments of the present disclosure, since a single picture/text subject matter is often monotonous and cannot logically display a complete piece of information. Therefore, in an application scenario provided by the embodiments of the present disclosure, multiple picture subject matters and text subject matters are combined, and a corresponding display structure is established based on labeling information corresponding to picture-text subject matters. A short video generated according to the display structure of the picture subject matters and text subject matters are displayed in order. Using a short video method may not only better express product attributes, but also enhance the user experience. Through the embodiments of the present disclosure, in a process of virtual host live broadcast marketing, related product pictures may be displayed by real-time switching to visually display selling point information, such as product attributes, features, advantages, etc., enhance the expressive power of a live broadcast room, and attract buyers for watching and download.

In the embodiments of the present disclosure, it still needs to be noted that, relative to a text on a product detail page, some pictures in the product detail page are only suitable for scrolling up and down for display, but pictures are rich in content and design, and so may be used as sources of picture-text subject matters for processing, reconstruction and applications in virtual host live broadcast scenarios, so that a fine-grained, multi-angle and richer three-dimensional display may be performed for a product.

Through the embodiments of the present disclosure, pictures of detail pages of a product may be reconstructed into a short video. First, pictures of detail pages of a product are reconstructed into a graph structure, and then subject matters of the product are converted into a short video using a logical relationship in the graph structure. In the embodiments of the present disclosure, the most important is a layout analysis and a graphic reconstruction of a detail page of a product.

In addition, it should be noted that the reconstructed short video may also be added with current information, such as transaction information, comment information, and host interaction information, etc., in real time in a display process.

Figure 2:
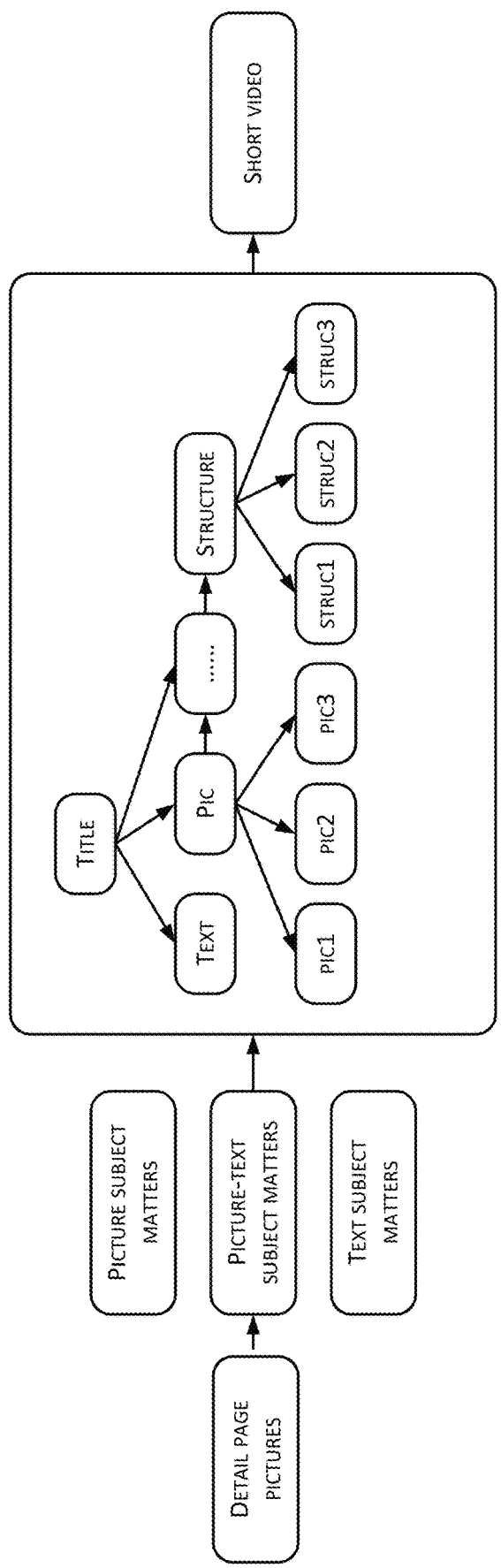
FIG. 2 is a flowchart of a video generation method according to the embodiments of the present disclosure.

In the embodiments of the present disclosure, as shown in FIG. 2, the layout analysis part mainly employs two methods (coarse labeling and fine labeling) to construct target detection training samples, and then uses a three-step training method for model training to obtain picture subject matters, picture-text subject matters, and text subject matters. The picture and text reconstruction part performs an ordering analysis and a level determination on the subject matters, and obtains a title, a text, a structure (stru1, stru2, stru3), and picture, i.e., pic (pic1, pic2, pic3), as shown in FIG. 2. Reconstructing a picture and text file is performed in conjunction with the layout analysis to obtain a final graph structure. Finally, a short video is generated according to an ordering structure of the picture and text reconstruction part.

For example, an application scenario of applying the video generation method provided in the embodiments of the present disclosure in a process of live broadcast marketing by a virtual host is used as an example for describing the foregoing embodiments of the present disclosure in detail. In a process of live broadcast marketing by a virtual host, by combining multiple picture subject matters and text subject matters, video splicing is performed for stores of marketing products and brand elements. A corresponding display structure is established based on labeling information corresponding to the picture-text subject matters. A short video generated according to the display structure of the picture subject matters and the text subject matters is displayed in order. Using a short video to display marketing products and displaying relevant pictures of the products by real-time switching, selling point information such as the of the product attributes, features, advantages, etc., can be visually displayed, thereby being able to further enhance the performance ability of a virtual host in a live broadcast room, and attracting buyers to watch and place orders. In the above-mentioned optional solutions, not only product attributes of marketing products may be better represented, but users' shopping experience may also be enhanced by watching the live broadcast.

In addition, based on differences between application scenarios and application personalization, the present disclosure may also provide an optional embodiment of a video generation method applied to a virtual host live broadcast marketing scenario, to describe the foregoing embodiments of the present disclosure in detail. For example, if a current marketing scenario of live broadcast of a virtual host is a traditional ethnic festival, such as Spring Festival, Laba Festival, etc., a finally displayed short video of the "Spring Festival" marketing scenario of live broadcast may show one or more picture elements, text elements, or picture and text elements, such as "Spring Couplets", "Firecrackers", "New Year", "Farewell to the Old and Welcome the New", "Welcome New Year and Send Blessings", etc. Alternatively, a finally displayed short video of the "Laba Festival" live broadcast scene marketing scenario of live broadcast may show one or more picture elements, text elements, or picture and text elements, such as "Laba Congee", ""Laba Festival", etc. For another example, if a current marketing scenario of live broadcast of a virtual host is a novel festival, such as Valentine's Day, Christmas, etc., a finally displayed short video of the "Valentine's Day" live broadcast scene marketing scenario may show one or more picture elements, text elements, or picture and text elements, such as "roses", "couples", "marriage and love", etc. In the embodiments of the present disclosure, by processing and reconstructing promotional or interactive holiday elements as sources of picture-text subject matters and applying them to a virtual host live broadcast scenario, a fine-grained, multi-angle and richer three-dimensional display may be performed for a product.

In the embodiments of the present disclosure, extracting the multiple subject matters from the multiple original files includes:

Step S302: Use a region of interest recognition method to detect picture blocks in the multiple original files to obtain picture subject matters.

Step S304: Use an optical character recognition method to detect text blocks in the multiple original files, and use layout rules of the text blocks to obtain text subject matters.

Step S306: Combine the picture blocks and the text blocks based on the layout rules to obtain picture-text subject matters.

In the embodiments of the present disclosure, different recognition methods may be used to analyze detail page pictures, and extract different types of subject matters from the detail page pictures, for example, picture subject matters, picture-text subject matters, and text subject matters.

In the embodiments of the present disclosure, a ROI recognition method (Canny operator) of OpenCV may be used to detect an image area in a detail page of a product and remove a purely text area and a purely color block area to obtain an image subject matter. At the same time, an optical character recognition OCR method is used to detect text blocks in the detail page of the product, and combine them according to layout rules (for example, a row height and a size of a text, and a spacing between different text blocks) to obtain a text block area as a text subject matter. Finally, layout rules (such as a text size, a relative distance, a nesting situation, etc.) are used to combine a text block and a picture block to obtain a picture-text subject matter.

In the embodiments of the present disclosure, combining the picture block and the text block based on the layout rules to obtain the picture-text subject matter includes:

Step S402: Combine the picture block and the text block into the picture-text subject matter when the text block is located in a first preset area inside the picture block and a proportion of an inside part of the picture block that the text block accounts for is greater than a first preset threshold.

Step S404: Combine the picture block and the text block into the picture-text subject matter when the text block is located in a second preset area outside the picture block and a distance between the text block and the picture block is less than a second preset threshold.

In the embodiments of the present disclosure, combining the picture block and the text block based on the layout rules includes: (1) combining the picture block and the text block into the picture-text subject matter if the text block is around the picture block and accounts for greater than 15% of the picture block, that is, the distance between the text block and the picture block is greater than the second preset threshold; (2) ignoring a text if the text block accounts for less than 15% of an image; (3) ignoring the image if the text block accounts for greater than 70% of the image; and (4) combining the picture block and the text block into the picture-text subject matter if the text block is around the picture block and the distance therebetween is relatively close, that is, the distance between the text block and the picture block is less than the second preset threshold.

In the embodiments of the present disclosure, extracting the labeling information corresponding to the multiple subject matters from the multiple original files includes:

Step S502: Use a first target neural network model to extract the labeling information corresponding to the multiple subject matters from the multiple original files.

In the embodiments of the present disclosure, the first target neural network model may be a single-stage detection SSD model. In the embodiments of the present disclosure, the SSD model uses VGG16 as a basic model, and adds convolutional layer(s) on the basis of VGG16 to obtain more feature maps for performing target detection.

In the embodiments of the present disclosure, the SSD model is used to identify and detect elements in an image, and is able to ensure the speed and accuracy of target detection. A main idea thereof is that the model first uniformly performs dense sampling at different positions of a picture, and obtains images using different scales and different aspect ratios when sampling. A CNN is then used to extract features in the images to directly perform classification and regression. The SSD model only requires one step in the entire process, which is faster than other two-stage target detection methods and is suitable for operations in an online environment.

In the embodiments of the present disclosure, the video generation method further includes:

Step S602: Construct a training data set, wherein the training data set includes: first label data and second label data, the first label data being label data obtained by machine learning, and the second label data being label data obtained by a manual labeling method.

Step S604: Train an initial neural network model using the training data set to obtain the first target neural network model, wherein the initial neural network model is a network model obtained by pre-training using the initial data set.

Figure 3:
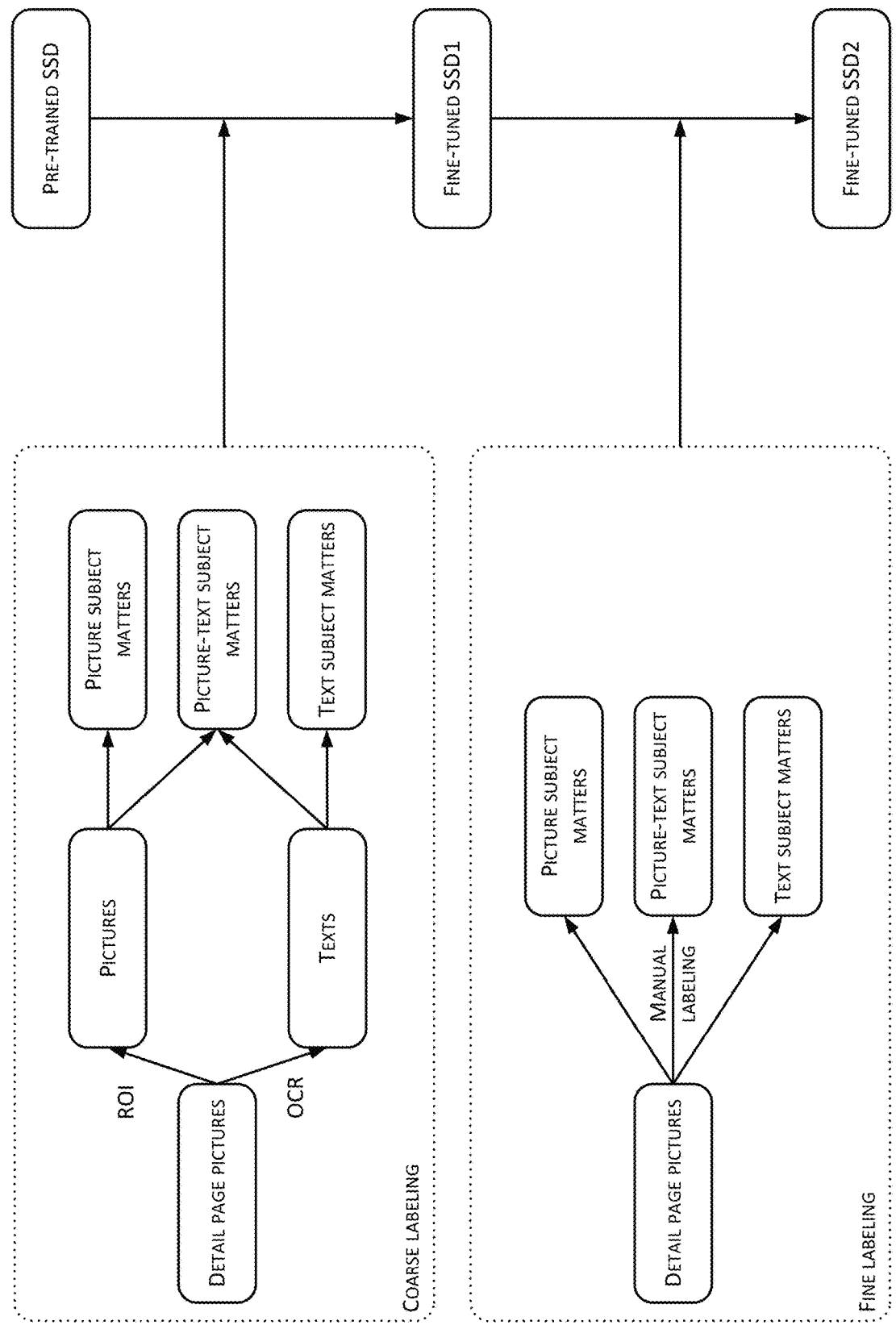
FIG. 3 is a flowchart of a layout analysis method according to the embodiments of the present disclosure.

In the embodiments of the present disclosure, the first target neural network model may be a deep target detection model. In the embodiments of the present disclosure, as shown in FIG. 3, coarse labeling of multiple subject matters of detail page pictures is performed through a machine learning method (e.g., a ROI method and an OCR method) to obtain coarse label data of the multiple subject matters, and a small amount of fine label data is then labeled by manual labeling to fine-tune parameters of the initial neural network model. In a process of labeling, the same labeling is performed for picture subject matters, text subject matters, picture-text subject matters—labeling of these three parts.

In the embodiments of the present disclosure, training the initial neural network model using the training data set to obtain the first target neural network model includes:

Step S702: Perform first fine-tuning training on the initial neural network model using the first label data to obtain an intermediate neural network model.

Step S704: Perform a second fine-tuning training on the intermediate neural network model using the second label data to obtain the first target neural network model.

As shown in FIG. 3, when training an initial neural network model, the first step is to use coarse label data in a training data set (Pre-trained SSD) to perform a first fine-tuning training to obtain an intermediate neural network model (Fine-trained SSD1). Since the training data set has a large amount of data and data labels are relatively accurate, it may be better used as a first-stage training of the model to learn basic features such as points and lines, etc., of images. The second step is to use the coarse label data to perform a second fine-tuning training on the intermediate neural network model that is obtained after a completion of the first-stage training. Since the data amount of coarse label data is relatively large and includes a lot of noisy data, this data is first used for performing the second fine-tuning training on the pre-trained model to obtain a first neural network model (Fine-trained SSD2), thus enabling the first neural network model to learn basic features of information such as pictures, texts, structures, etc. Furthermore, a large amount of data may better calibrate the effects of the model. Through the embodiments of the present disclosure, fine-label data is used to perform a second fine-tuning training on the intermediate neural network model to learn image features in a more refined way, and reduce the influence of noises on the model.

In the embodiments of the present disclosure, establishing the display structure corresponding to the multiple subject matters based on the labeling information includes:

Step S802: Establish a display structure corresponding to the multiple subject matters based on the labeling information and a second target neural network model.

In the embodiments of the present disclosure, after obtaining multiple subject matters such as picture subject matters, text subject matters, and picture-text subject matters, all the subject matters are constructed into a graph structure having hierarchical and ordering information through a picture-text reconstruction method.

In the embodiments of the present disclosure, the above implementation steps may be divided into three steps for operations. The first step is to determine a title attribute (i.e., labeling information) of an entire product image to control all subject matter information. The second step is to cluster subject matters, divide all the subject matters in coarse-grained granularity, and classify semantically related subject matters into a same category. The third step is to demarcate each sub-category obtained in the second step in order, and determine a display order of precedence of each sub-subject matter to obtain a final graph structure. The fourth step is to splice the subject matters according to the order and add transition effects to obtain a final short video.

In the embodiments of the present disclosure, the title attribute may be obtained by the following method: a product image requires a title to summarize all the sub-subject matters in the image, which is convenient for retrieving information in the image on the one hand, and is also able to perform qualitative analysis of some subject matters on the other hand.

In the embodiments of the present disclosure, the solutions of the present disclosure may obtain the title attribute through the following implementation steps:

In the first step, a classification algorithm is used to determine whether a title attribute is included in a text element within a child element. In this step, a convolutional neural network is selected as a sentence classification model. Compared with other text classification models, the convolutional neural network may improve the running speed of the target neural network model as much as possible while ensuring the accuracy.

In the second step, after going through the classification algorithm, a title needs to be generated through a generation model after determining that no title attribute is included in the text element in the sub-element. In this step, the solutions of the present disclosure adopt a Transformer as the generation model, summary generation is performed after all text elements are spliced, and title attributes of all sub-subject matters are finally obtained.

In the embodiments of the present disclosure, establishing the display structure corresponding to the multiple subject matters based on the labeling information and the second target neural network model includes:

Step S902: Perform clustering processing on the multiple subject matters based on the labeling information and the second target neural network model to obtain multiple subject matter sub-categories.

Step S904: Perform ordering determination on each of the multiple subject matter sub-categories to obtain the display structure.

Figure 4:
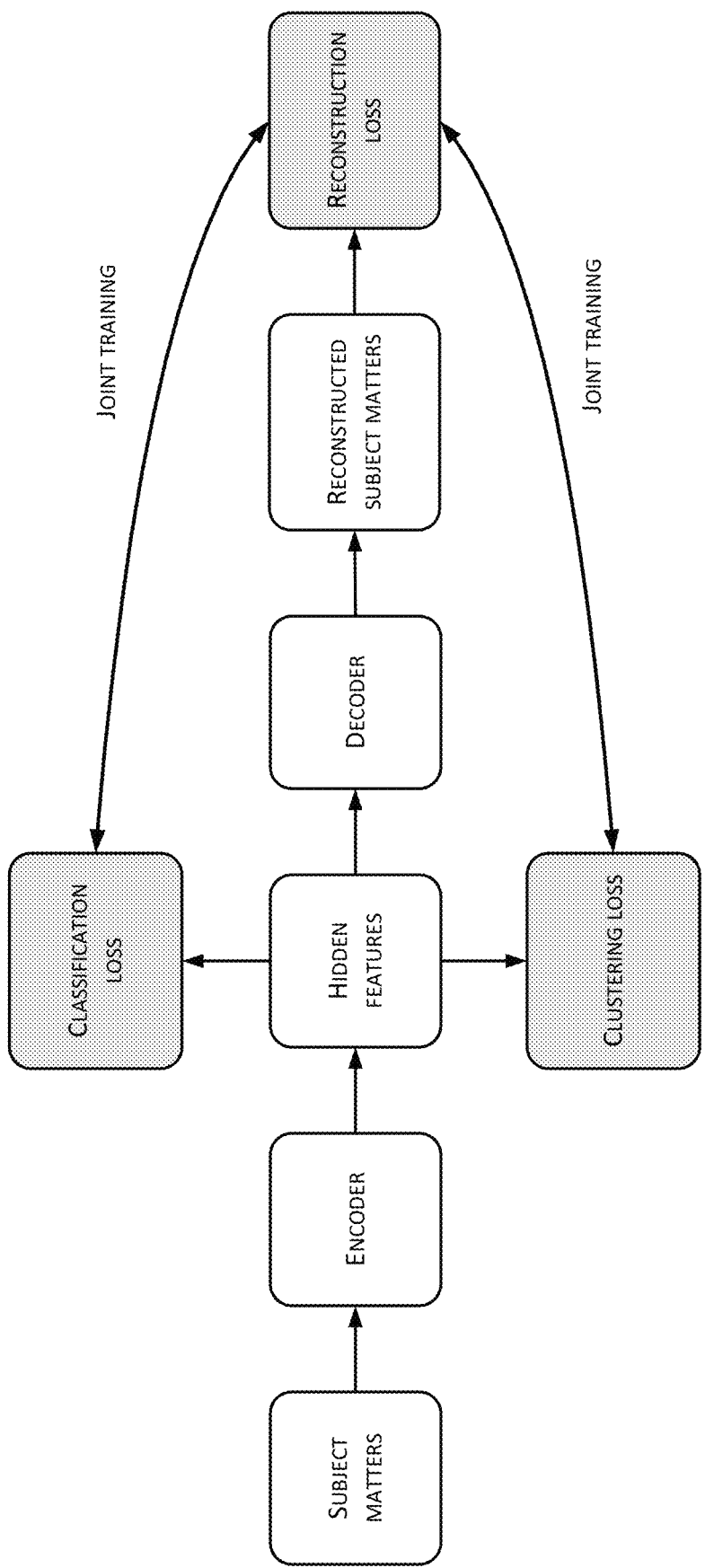
FIG. 4 is a flowchart of a second target neural network model according to the embodiments of the present disclosure.

In the embodiments of the present disclosure, as shown in FIG. 4, the second target neural network model is a multi-modal clustering model. The second target neural network model and the labeling information may be used to establish a display structure corresponding to the multiple subject matters, and encoding may be performed for multiple subject matters, and respective coding of multiple subject matters of different types is aligned.

In the embodiments of the present disclosure, the second target neural network model is a clustering model obtained after joint training using a reconstruction loss, a clustering loss and a classification loss. The reconstruction loss is a loss calculated and obtained by encoding the multiple subject matters and constructing hidden layer features. The clustering loss is a loss calculated and obtained by using the hidden layer features for subject matter clustering. The classification loss is a loss calculated and obtained by encoding the multiple subject matters and aligning respective coding of different types of subject matters.

After obtaining the labeling information of all the sub-subject matters, remaining sub-subject matters are clustered, and sub-subject matters under the same title or content are classified into a category (for example, pictures associated with an order of use of cosmetics are classified into one category, etc.). In the embodiments of the present disclosure, a multi-modal clustering model is used for subject matter clustering, and the second target neural network model may be obtained by training in the following method:

In the first step, a multi-modal clustering model uses an auto-encoder to construct hidden layer features and calculate a reconstruction loss. In the second step, the multi-modal clustering model uses the hidden layer features to perform clustering and calculate a clustering loss, In the third step, since multi-modal data may have differences between multi-modalities when encoding, it is necessary to perform alignment between multi-modalities. In order to complete this function, the multi-modal clustering model constructs a discriminator and use the hidden layer features to perform a two-class classification task (determine whether an associated feature is an image feature or a text feature). An encoder needs to make hidden layer features difficult to distinguish correctly by encoding, while the discriminator continues to learn how to better distinguish therebetween, thus forming an adversarial learning relationship, calculating an adversarial loss, and improving the accuracy of modal alignment. Finally, the second target neural network model is obtained after joint training of the reconstruction loss, the clustering loss and the classification loss.

In the embodiments of the present disclosure, after clustering all the sub-subject matters, it is necessary to determine an order of all elements in each sub-category, and determine an order in which they may be displayed in a video, so as to construct a complete graph structure. In order to complete this function, in the embodiments of the present disclosure, a determination may be made by using layout rules. According to design characteristics of product images, an order of subject matters in a same set is determined according to coordinate information in an original image, with a subject matter closer to the upper left being closer to the front in the order.

In the embodiments of the present disclosure, combining the multiple subject matters using the display structure to generate the target video includes:

Step S1002: Determine a display order of the multiple subject matters based on the display structure.

Step S1004: Perform video editing processing on the multiple subject matters according to the display order, and add transition special effects between adjacent subject matters in the multiple subject matters to generate the target video.

In the embodiments of the present disclosure, after obtaining the multiple subject matters and determining an order thereof, a final short video file may be obtained by ordering and arranging the multiple subject matters and adding transition effects between adjacent subject matters of the multiple subject matters.

Figure 6:
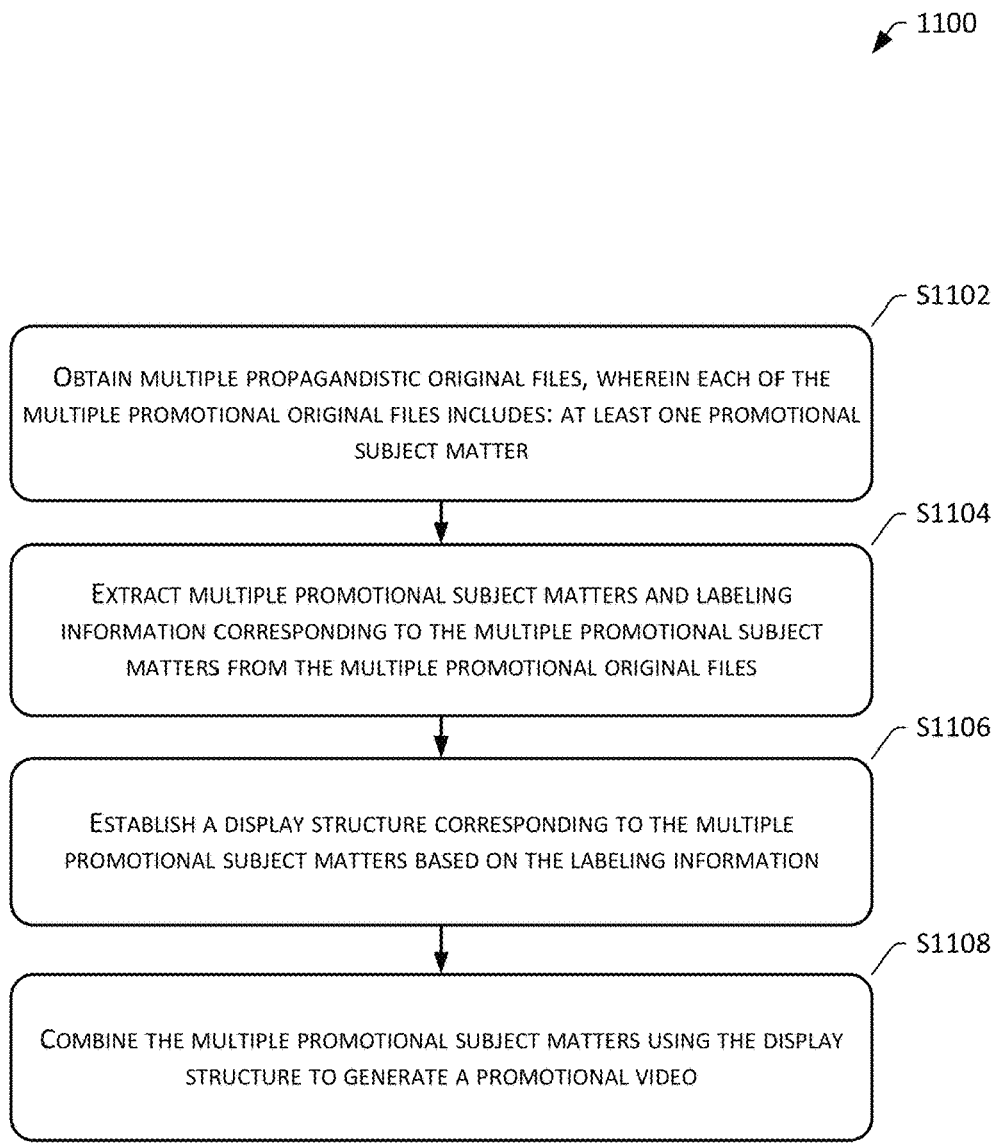
FIG. 6 is a flowchart of a method for generating a promotional video according to the embodiments of the present disclosure.

In the above operating environment, the present disclosure provides a method for generating a promotional video as shown in FIG. 6. FIG. 6 is a flowchart of a method 1100 for generating a promotional video according to the embodiments of the present disclosure. As shown in FIG. 6, the method 1100 for generating a promotional video includes the following method steps:

Step S1102: Obtain multiple promotional original files, wherein each of the multiple promotional original files includes: at least one promotional subject matter.

Step S1104: Extract multiple promotional subject matters and labeling information corresponding to the multiple promotional subject matters from the multiple promotional original files.

Step S1106: Establish a display structure corresponding to the multiple promotional subject matters based on the labeling information.

Step S1108: Combine the multiple promotional subject matters using the display structure to generate a promotional video.

In the embodiments of the application, obtaining the multiple promotional original files are obtained, wherein each of the multiple promotional original files includes: at least one promotional subject matter; extracting multiple promotional subject matters and labeling information corresponding to the multiple promotional subject matters from the multiple promotional original files; establishing a display structure corresponding to the multiple promotional subject matters based on the labeling information; and combining the multiple promotional subject matters using the display structure to generate a promotional video.

The solutions of the present disclosure use picture and text information on a product detail page perform file reconstruction to generate a short video. First, each promotional original file of multiple promotional original files is obtained, and multiple subject matters are extracted and labeling information corresponding to the multiple subject matters from the multiple promotional original files. Based on the labeling information, a display order of each subject matter is determined, and an image processing method is then used to combine the multiple subject matters based on the display order to generate a short video.

Therefore, the embodiments of the present disclosure achieve the purpose of automatically reconstructing and generating video data based on picture and text subject matters, thereby achieving a fuller three-dimensional display of products, enhancing the technical effects of user experience, and solving the technical problems of the difficulties in automatic reconstruction and generation of video data from product detail pages in the existing technologies.

In the embodiments of the present disclosure, the promotional original files may be promotional subject matters, for example, promotional subject matters containing specific items (for example, commodities). The multiple subject matters may be picture subject matters, picture-text subject matters and text subject matters. The promotional type video may be a promotional video, for example, a promotional video including specific items (for example, an opening video, a composite trending video, geographic attributes, interactions of comments), etc.

In the embodiments of the present disclosure, the labeling information is used to label a subject matter type of each subject matter. For example, a label may be used for labeling. Based on the labeling information, a display structure corresponding to the multiple subject matters may be established. Such display result may be a graph structure having hierarchical and ordering information, that is, an ordering structure used for picture and text reconstruction. the display structure may be used to combine the multiple subject matters to generate a target video.

It should be noted that the video generation method provided by the embodiments of the present disclosure may be, but is not limited to, applied to a virtual human live broadcast scenario, for example, a commodity display scenario in a process of virtual host live broadcasting, a virtual host live broadcast marketing scenario, and may also be extended to be used in a live broadcast e-commerce scenario.

In the embodiments of the present disclosure, since a single picture/text subject matter is often monotonous and cannot logically display a complete piece of information. Therefore, in an application scenario provided by the embodiments of the present disclosure, multiple picture subject matters and text subject matters are combined, and a corresponding display structure is established based on labeling information corresponding to picture-text subject matters. A short video generated according to the display structure of the picture subject matters and text subject matters are displayed in order. Using a short video method may not only better express product attributes, but also enhance the user experience. Through the embodiments of the present disclosure, in a process of virtual host live broadcast marketing, related product pictures may be displayed by real-time switching to visually display selling point information, such as product attributes, features, advantages, etc., enhance the expressive power of a live broadcast room, and attract buyers for watching and download.

In the embodiments of the present disclosure, it still needs to be noted that, relative to a text on a product detail page, some pictures in the product detail page are only suitable for scrolling up and down for display, but pictures are rich in content and design, and so may be used as sources of picture-text subject matters for processing, reconstruction and applications in virtual host live broadcast scenarios, so that a fine-grained, multi-angle and richer three-dimensional display may be performed for a product.

Figure 5:
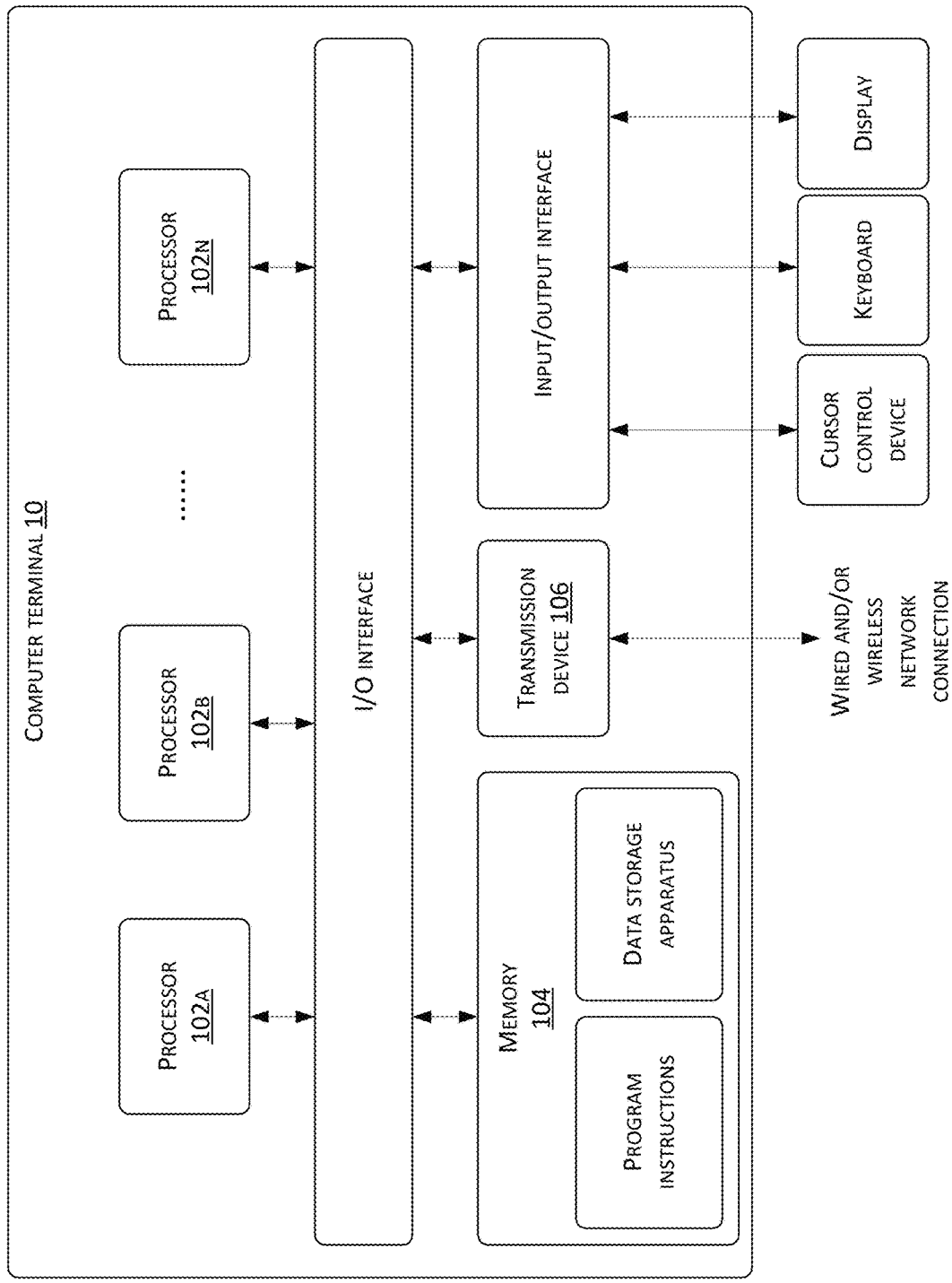
FIG. 5 is a structural block diagram of hardware of a computer terminal (or mobile device) for implementing a video generation method according to the embodiments of the present disclosure.

The method embodiments provided in the foregoing description of the present disclosure may be executed in a mobile terminal, a computer terminal or a similar computing apparatus. FIG. 5 shows a block diagram of a hardware structure of a computer terminal (or mobile device) for implementing a video generation method. As shown in FIG. 5, the computer terminal 10 (or mobile device 10) may include one or more (102a, 102b, . . . , 102n as shown in the figure) the processors 102 (the processor 102 may include, but is not limited to, a processing apparatus such as a microprocessor MCU or a programmable logic device FPGA), a memory 104 used for storing data, and a transmission device 106 used for communication functions. In addition, a display, an input/output interface (I/O interface), a universal serial bus (USB) port (which may be included as one of the BUS ports), a network interface, a power supply and/or a camera may also be included. One of ordinary skill in the art may understand that the structure shown in FIG. 5 is illustrative only, and does not limit the structure of the electronic device as described above. For example, the computer terminal 10 may also include more or fewer components than those shown in FIG. 5, or have a configuration different from that shown in FIG. 5.

It should be noted that the one or more processors 102 and/or other data processing circuits may generally be referred to as "data processing circuits" herein. The data processing circuit may be embodied in whole or in part as software, hardware, firmware or any other combination. In addition, the data processing circuit may be a single independent processing module, or fully or partially integrated into any one of the other elements in the computer terminal 10 (or mobile device). As mentioned in the embodiments of the present disclosure, the data processing circuit is used as a kind of processor control (for example, a selection of a variable resistance terminal path connected to an interface).

The memory 104 may be used to store software programs and modules of application software, such as program instructions/data storage devices corresponding to the video generation methods in the embodiments of the present disclosure. The processor 102 executes functional applications and data processing stored in the memory 104 by running the software programs and modules various to realize the video generation methods as described above. The memory 104 may include a high-speed random access memory, and may also include a non-volatile memory, such as one or more magnetic storage devices, a flash memory, or other non-volatile solid-state memory. In some examples, the memory 104 may further include storage devices remotely deployed with respect to the processor 102, and these remote storage devices may be connected to the computer terminal 10 via a network. Examples of the network include, but are not limited to, the Internet, a corporate intranet, a local area network, a mobile communication network, and a combination thereof.

The transmission device 106 is used to receive or send data via a network. A specific example of the network may include a wireless network provided by a communication provider of the computer terminal 10. In an example, the transmission device 106 includes a network adapter (Network Interface Controller, NIC), which may be connected to other network devices through a base station so as to communicate with the Internet. In an example, the transmission device 106 may be a radio frequency (RF) module, which is used to communicate with the Internet wirelessly.

The display may, for example, be a touchscreen liquid crystal display (LCD), which may enable a user to interact with a user interface of the computer terminal 10 (or mobile device).

It should be noted that the foregoing method embodiments are all expressed as a series of action combinations for the sake of simple description. However, one skilled in the art should know that the present disclosure is not limited by the described orders of actions, because some steps may be performed in other order or concurrently according to the present disclosure. Secondly, one skilled in the art should also be aware that the embodiments described in the specification are all exemplary embodiments, and actions and modules involved therein may not be necessarily required by the present disclosure.

Through the description of the above embodiments, one skilled in the art may clearly understand that the methods according to the above embodiments may be implemented by means of software plus a necessary general hardware platform, and apparently may also be implemented by hardware. However, in many cases the former is a better implementation. Based on such understanding, the essence of the technical solutions of the present disclosure or the parts that contribute to the existing technologies may be embodied in a form of a software product. Such computer software product is stored in a non-volatile storage medium (such as ROM/RAM, a magnetic disk, an optical disk), which includes a number of instructions to cause a terminal device (which may be a mobile phone, a computer, a server, or a network device, etc.) to execute the methods described in various embodiments of the present disclosure.

Figure 7:
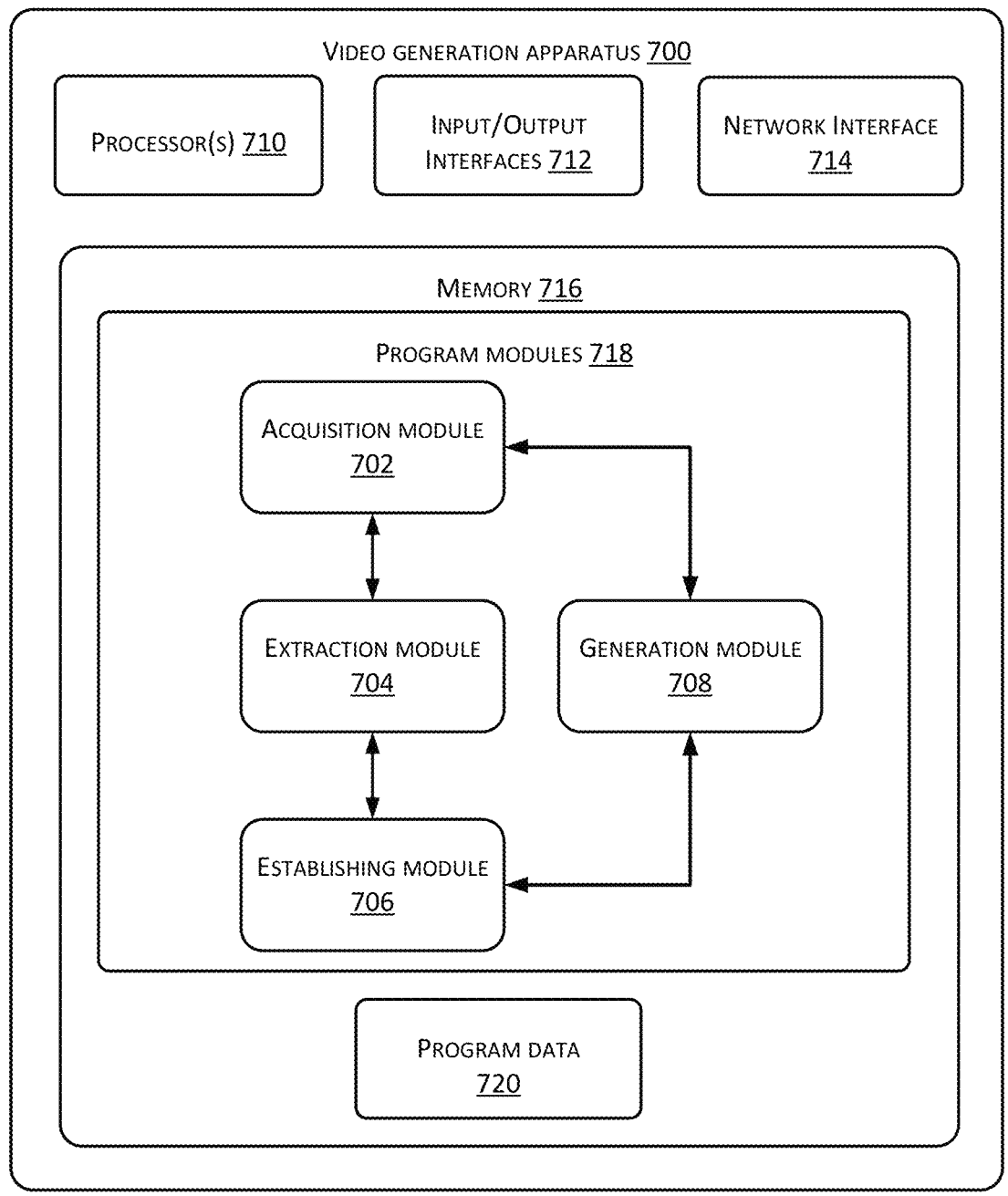
FIG. 7 is a schematic structural diagram of a video generating apparatus according to the embodiments of the present disclosure.

According to the embodiment of the present disclosure, an example apparatus for implementing the above-mentioned video generation method is also provided. FIG. 7 is a schematic structural diagram of a video generation apparatus 700 according to the embodiments of the present disclosure. As shown in FIG. 7, the apparatus includes: an acquisition module 702, an extraction module 704, an establishing module 706, and a generation module 708, wherein:

the acquisition module 702 is configured to obtain a plurality of original files, each of the plurality of original files includes at least one subject matter; the extraction module 704 is configured to extract multiple subject matters and labeling information corresponding to the multiple subject matters from the plurality of original files; the establishing module 706 is configured to a display structure corresponding to the multiple subject matters based on the labeling information; and the generation module 708 is configured to the multiple subject matters using the display structure to generate a target video.

In implementations, the apparatus 700 may further include one or more processors 710, an input/output (I/O) interface 712, a network interface 714, and a memory 716. In implementations, the memory 716 may include program modules 718 and program data 720. The program modules 718 may include one or more of the foregoing modules as described in FIG. 7.

In implementations, the memory 716 may include a form of computer readable media such as a volatile memory, a random access memory (RAM) and/or a non-volatile memory, for example, a read-only memory (ROM) or a flash RAM. The memory 716 is an example of a computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

It should be noted herein that the acquisition module 702, the extraction module 704, establishing module 706, and generation module 708 correspond to steps S202 to S208 in the foregoing embodiments. Examples and application scenarios implemented by these four modules are same as those of the corresponding steps, but not limited to the content disclosed in the foregoing embodiments. It should be noted that, the above-mentioned modules may run as a part of the apparatus in the computer terminal 10 provided in the foregoing embodiments.

Figure 8:
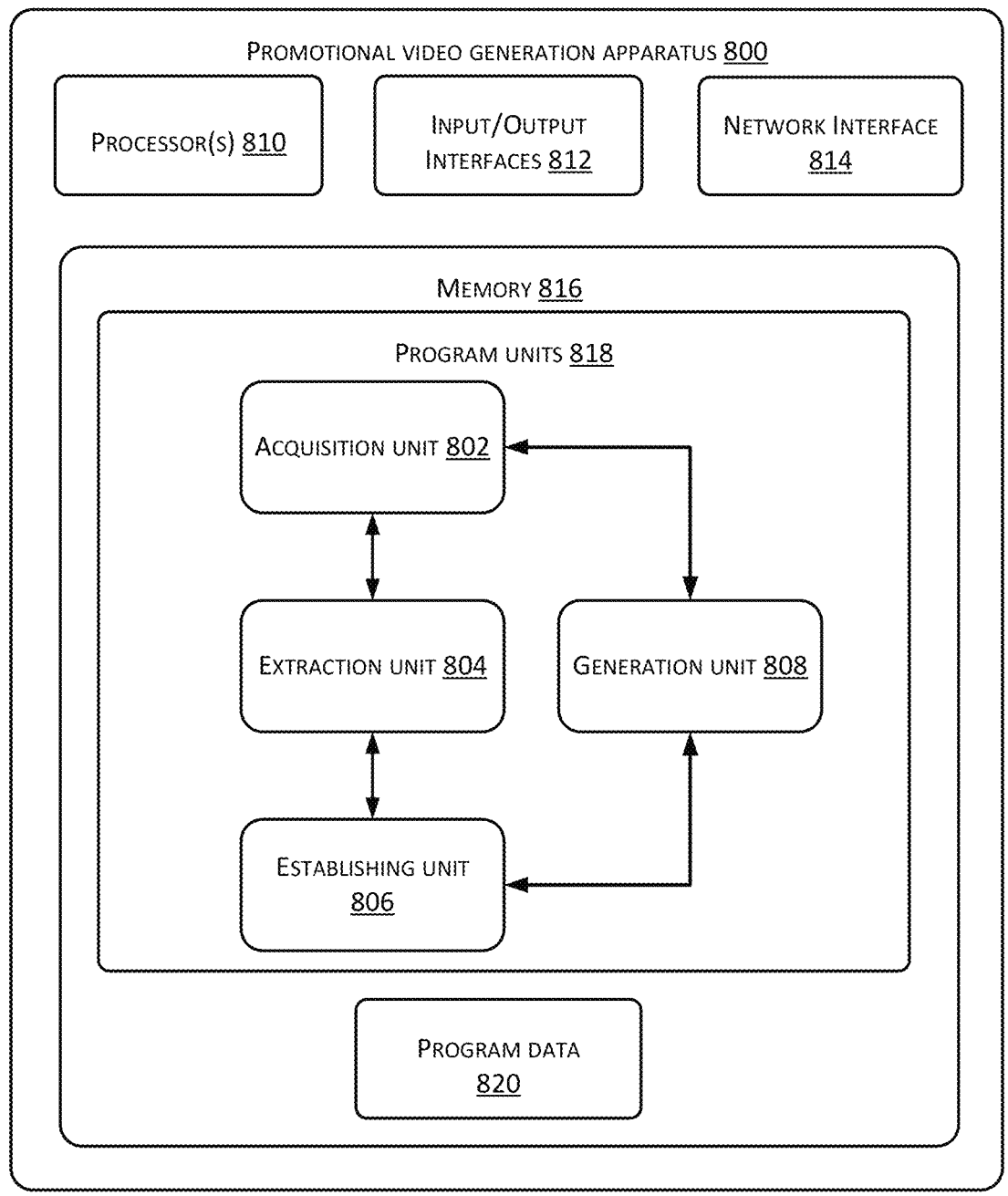
FIG. 8 is a schematic structural diagram of a promotional video generating apparatus according to the embodiments of the present disclosure.

According to the embodiment of the present disclosure, an example apparatus for implementing the above-mentioned promotional video generation method is also provided. FIG. 8 is a schematic structural diagram of a promotional video generation apparatus 800 according to the embodiments of the present disclosure. As shown in FIG. 8, the apparatus 800 includes: an acquisition unit 802, an extraction unit 804, an establishing unit 806, and a generation unit 808, wherein:

the acquisition unit 802 is configured to obtain a plurality of promotional original files, wherein each of the plurality of promotional original files includes: at least one promotional subject matter; the extraction unit 804 extracts multiple promotional subject matters and labeling information corresponding to the multiple promotional subject matters from the plurality of promotional original files; the establishing unit 806 is configured to establish a display structure corresponding to the multiple promotional subject matters based on the labeling information; and the generation unit 808 combines the multiple promotional subject matters using the display structure to generate a promotional video.

In implementations, the apparatus 800 may further include one or more processors 810, an input/output (I/O) interface 812, a network interface 814, and a memory 816. In implementations, the memory 816 may include program units 818 and program data 820. The program units 818 may include one or more of the foregoing units as described in FIG. 8.

In implementations, the memory 816 may include a form of computer readable media as described in the foregoing description.

It should be noted herein that the acquisition unit 802, the extraction unit 804, the establishing unit 806, and the generation unit 808 correspond to steps S1102 to S1108 in the foregoing embodiments. Examples and application scenarios implemented by these four units are same as those of the corresponding steps, but not limited to the content disclosed in the foregoing embodiments. It should be noted that, the above-mentioned units may run as a part of the apparatus in the computer terminal 10 provided in the foregoing embodiments.

It should be noted that exemplary implementations of this apparatus embodiment may be referenced to the related description in the foregoing embodiments, which will not be repeated herein.

According to the embodiments of the present disclosure, an example electronic device is also provided. The electronic device may be any computing device in a computing device group. The electronic device includes: a processor and a memory, wherein:

the processor; and the memory connected to the processor and configured to provide the processor with instructions for processing the following processing steps: obtaining a plurality of original files, each of the plurality of original files includes at least one subject matter; extracting multiple subject matters and labeling information corresponding to the multiple subject matters from the plurality of original files; establishing a display structure corresponding to the multiple subject matters based on the labeling information; and combining the multiple subject matters using the display structure to generate a target video.

In the embodiments of the present disclosure, multiple original files are obtained, each of the original files including at least one subject matter. Multiple subject matters and labeling information corresponding to the multiple subject matters are extracted from the multiple original files. Based on the labeling information, a display structure corresponding to the multiple subject matters is established. The display structure is used to combine the multiple subject matters to generate a target video.

The solutions of the present disclosure employ picture and text information of a product detail page to reconstruct a file to generate a short video. First, each original file in multiple original files is obtained, and multiple subject matters and labeling information corresponding to the multiple subject matters are extracted from the multiple original files. A corresponding display order of each subject matter is determined based on the labeling information, and an image processing method is then used to combine the multiple subject matters based on the display order to generate a short video.

Therefore, the embodiments of the present disclosure achieve the purpose of automatically reconstructing and generating video data based on graphic subject matters, thereby achieving a richer three-dimensional display of a product, enhancing the technical effects of user experience, and solving the difficulties of automatic reconstruction and generation of video data from a product detail page in the existing technologies.

It should be noted that exemplary implementations of this device embodiment may be referenced to the related description in the foregoing embodiments, which will not be repeated herein.

According to the embodiments of the present disclosure, an example computer terminal is also provided. The computer terminal may be any computer terminal device in a computer terminal group. In the embodiments of the present disclosure, the computer terminal may also be replaced with a terminal device such as a mobile terminal.

In the embodiments of the present disclosure, the computer terminal may be located in at least one network device of multiple network devices in a computer network.

In the embodiments of the present disclosure, the computer terminal may execute program codes of the following steps in a video generation method of an application program: obtaining a plurality of original files, each of the plurality of original files includes at least one subject matter; extracting multiple subject matters and labeling information corresponding to the multiple subject matters from the plurality of original files; establishing a display structure corresponding to the multiple subject matters based on the labeling information; and combining the multiple subject matters using the display structure to generate a target video.

Figure 9:
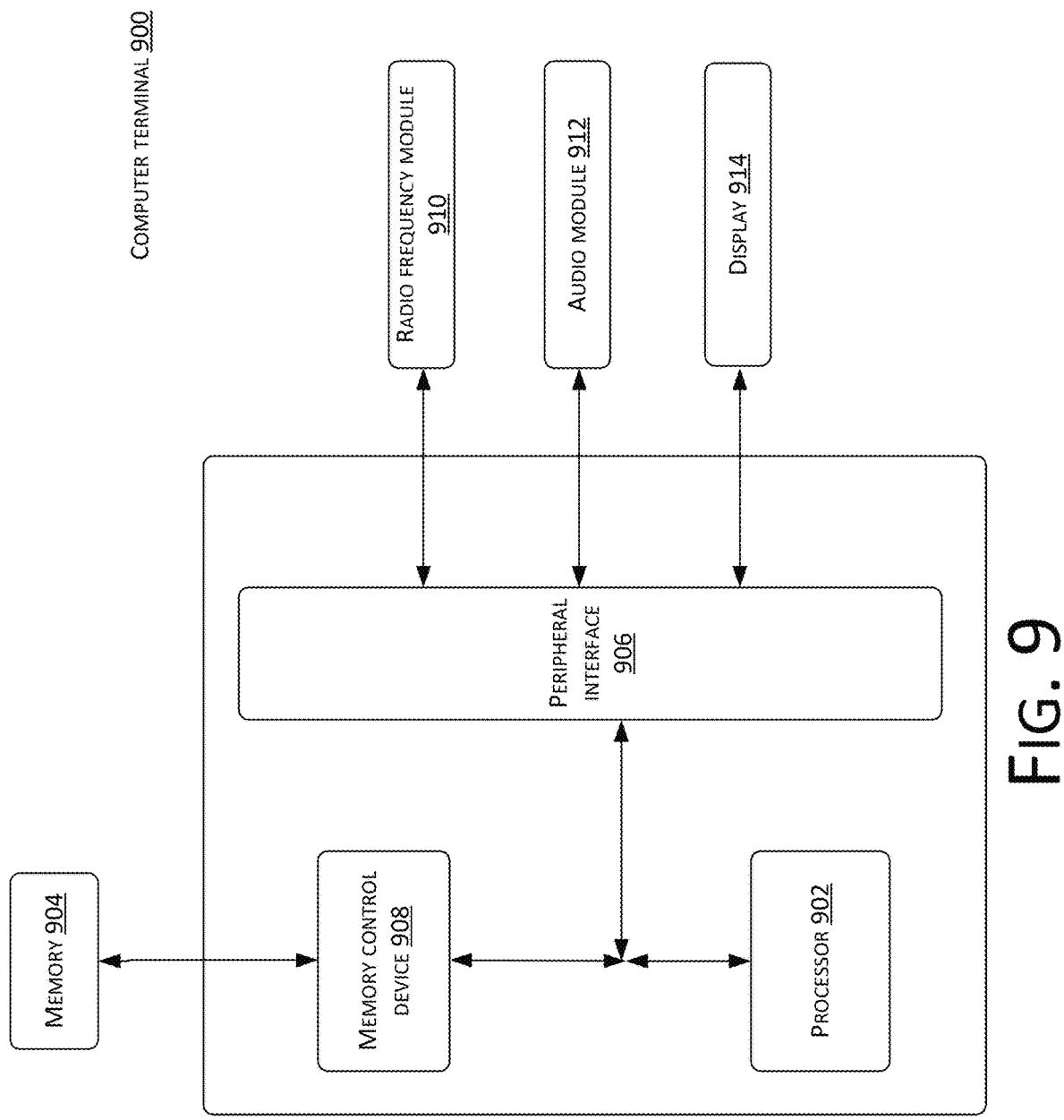
FIG. 9 is a structural block diagram of another computer terminal according to the embodiments of the present disclosure.

In the embodiments of the present disclosure, FIG. 9 is a structural block diagram of another computer terminal 900 according to the embodiments of the present disclosure. As shown in FIG. 9, the computer terminal 900 may include: one or more (only one is shown in the figure) processors 902, a memory 904, and a peripheral interface 906. In the embodiments of the present disclosure, the computer terminal 900 may further include a memory control device 908, a radio frequency module 910, an audio module 912, and a display 914, etc.

The memory 904 may be used to store software programs and modules, such as program instructions/modules corresponding to the video generation methods and apparatuses in the embodiments of the present disclosure. The processor executes various functional applications and data processing by running the software programs and modules stored in the memory, i.e., to implement the above-mentioned video generation methods. The memory may include a high-speed random access memory, and may also include a non-volatile memory, such as one or more magnetic storage devices, flash memory, or other non-volatile solid-state memory. In some examples, the memory may further include storage devices remotely provided with respect to the processor, and these remote storage devices may be connected to the computer terminal through a network. Examples of the network include, but are not limited to, the Internet, a corporate intranet, a local area network, a mobile communication network, and a combination thereof.

The processor 902 may call information and an application program stored in the memory through a transmission device to perform the following steps: obtaining multiple original files, each of the multiple original files includes at least one subject matter; extracting multiple subject matters and labeling information corresponding to the multiple subject matters from the multiple original files; establishing a display structure corresponding to the multiple subject matters based on the labeling information; and combining the multiple subject matters using the display structure to generate a target video.

In the embodiments of the present disclosure, the processor may also execute program codes of the following steps: using a region of interest recognition method to detect a picture block in the multiple original files to obtain a picture subject matter; using an optical character recognition method to detect a text block in the multiple original files and using layout rules of the text block to obtain a text subject matter; and combining the picture block and the text block to obtain a picture-text subject matter based on the layout rules.

In the embodiments of the present disclosure, the processor may also execute program codes of the following steps: combining the picture block and the text block into the picture-text subject matter when the text block is located in a first preset area inside the picture block and a proportion of an inside part of the picture block that the text block accounts for is greater than a first preset threshold; and combining the picture block and the text block into the picture-text subject matter when the text block is located in a second preset area outside the picture block and a distance between the text block and the picture block is less than a second preset threshold.

In the embodiments of the present disclosure, the processor may also execute program codes of the following steps: extracting the labeling information corresponding to the multiple subject matters from the multiple original files using a first target neural network model.

In the embodiments of the present disclosure, the processor may also execute program codes of the following steps: constructing a training data set, wherein the training data set includes: first label data and second label data, the first label data being label data obtained by machine learning, and the second label data being label data obtained by a manual labeling method; and training an initial neural network model using the training data set to obtain the first target neural network model, wherein the initial neural network model is a network model obtained by pre-training using the initial data set.

In the embodiments of the present disclosure, the processor may also execute program codes of the following steps: performing first fine-tuning training on the initial neural network model using the first label data to obtain an intermediate neural network model; and performing a second fine-tuning training on the intermediate neural network model using the second label data to obtain the first target neural network model.

In the embodiments of the present disclosure, the processor may also execute program codes of the following steps: establishing a display structure corresponding to the multiple subject matters based on the labeling information and the second target neural network model.

In the embodiments of the present disclosure, the processor may also execute program codes of the following steps: performing clustering processing on the multiple subject matters based on the labeling information and the second target neural network model to obtain multiple subject matter sub-categories; and performing ordering determination on each of the multiple subject matter sub-categories to obtain the display structure.

In the embodiments of the present disclosure, the processor may also execute program codes of the following steps: determining a display order of the multiple subject matters based on the display structure; and performing video editing processing on the multiple subject matters according to the display order, and adding transition special effects between adjacent subject matters in the multiple subject matters to generate the target video.

In the embodiments of the present disclosure, the processor may also execute program codes of the following steps: obtaining multiple promotional original files, wherein each of the multiple promotional original files includes: at least one promotional subject matter; extracting multiple promotional subject matters and labeling information corresponding to the multiple promotional subject matters from the multiple promotional original files; establishing a display structure corresponding to the multiple promotional subject matters based on the labeling information; and combining the multiple promotional subject matters using the display structure to generate a promotional video.

According to the embodiments of the present disclosure, solutions of video generation are provided. Multiple original files area obtained, each of the original files includes at least one subject matter. Multiple subject matters and labeling information corresponding to the foregoing multiple subject matters are extracted from the multiple original files. Based on the labeling information, a display structure corresponding to the multiple subject matters is established. Using the display structure, the multiple subject matters are combined to generate a target video.

The solutions of the present disclosure employ picture and text information of a product detail page to reconstruct a file to generate a short video. First, each original file in multiple original files is obtained, and multiple subject matters and labeling information corresponding to the multiple subject matters are extracted from the multiple original files. A corresponding display order of each subject matter is determined based on the labeling information, and an image processing method is then used to combine the multiple subject matters based on the display order to generate a short video.

Therefore, the embodiments of the present disclosure achieve the purpose of automatically reconstructing and generating video data based on graphic subject matters, thereby achieving a richer three-dimensional display of a product, enhancing the technical effects of user experience, and solving the difficulties of automatic reconstruction and generation of video data from a product detail page in the existing technologies.

One of ordinary skill in the art may understand that the structure shown in FIG. 9 is illustrative only, and the computer terminal may also be a terminal device, such as a smart phone (such as an Android phone, an iOS phone, etc.), a tablet computer, a palmtop computer, and a mobile Internet device (MID), a PAD, etc. FIG. 9 does not limit the structure of the above-mentioned electronic device. For example, the computer terminal may also include more or fewer components (such as a network interface, a display device, etc.) than those shown in FIG. 9 or have a configuration from different that shown in FIG. 9.

One of ordinary skill in the art may understand that all or part of the steps in various methods of the above-mentioned embodiments may be completed by instructing relevant hardware of a terminal device through a program. This program may be stored in a computer-readable non-volatile storage medium. The non-volatile storage medium may include: flash disk, read-only memory (ROM), random access memory (RAM), a magnetic disk, or an optical disk, etc.

According to the embodiments of the present disclosure, an example non-volatile storage medium is also provided. In the embodiments of the present disclosure, the non-volatile storage medium includes a stored program, wherein the program, when running, controls a device where the non-volatile storage medium is located to execute the above-mentioned video generation methods and the above-mentioned promotional video generation method.

In the embodiments of the present disclosure, the non-volatile storage medium may be located in any computer terminal in a computer terminal group in a computer network, or located in any mobile terminal in a mobile terminal group.

In the embodiments of the present disclosure, the non-volatile storage medium is configured to store program codes for performing the following steps: obtaining multiple original files, each of the multiple original files includes at least one subject matter; extracting multiple subject matters and labeling information corresponding to the multiple subject matters from the multiple original files; establishing a display structure corresponding to the multiple subject matters based on the labeling information; and combining the multiple subject matters using the display structure to generate a target video.

In the embodiments of the present disclosure, the non-volatile storage medium is configured to store program codes for performing the following steps: using a region of interest recognition method to detect a picture block in the multiple original files to obtain a picture subject matter; using an optical character recognition method to detect a text block in the multiple original files and using layout rules of the text block to obtain a text subject matter; and combining the picture block and the text block to obtain a picture-text subject matter based on the layout rules.

In the embodiments of the present disclosure, the non-volatile storage medium is configured to store program codes for performing the following steps: combining the picture block and the text block into the picture-text subject matter when the text block is located in a first preset area inside the picture block and a proportion of an inside part of the picture block that the text block accounts for is greater than a first preset threshold; and combining the picture block and the text block into the picture-text subject matter when the text block is located in a second preset area outside the picture block and a distance between the text block and the picture block is less than a second preset threshold.

In the embodiments of the present disclosure, the non-volatile storage medium is configured to store the program codes for performing the following steps: extracting the labeling information corresponding to the multiple subject matters from the multiple original files using a first target neural network model.

In the embodiments of the present disclosure, the non-volatile storage medium is configured to store program codes for performing the following steps: constructing a training data set, wherein the training data set includes: first label data and second label data, the first label data being label data obtained by machine learning, and the second label data being label data obtained by a manual labeling method; and training an initial neural network model using the training data set to obtain the first target neural network model, wherein the initial neural network model is a network model obtained by pre-training using the initial data set.

In the embodiments of the present disclosure, the non-volatile storage medium is set to store program codes for performing the following steps: performing first fine-tuning training on the initial neural network model using the first label data to obtain an intermediate neural network model; and performing a second fine-tuning training on the intermediate neural network model using the second label data to obtain the first target neural network model.

In the embodiments of the present disclosure, the non-volatile storage medium is configured to store program codes for executing the following steps: establishing a display structure corresponding to the multiple subject matters based on the labeling information and the second target neural network model.

In the embodiments of the present disclosure, the non-volatile storage medium is configured to store program codes for performing the following steps: performing clustering processing on the multiple subject matters based on the labeling information and the second target neural network model to obtain multiple subject matter sub-categories; and performing ordering determination on each of the multiple subject matter sub-categories to obtain the display structure.

In the embodiments of the present disclosure, the non-volatile storage medium is configured to store program codes for performing the following steps: determining a display order of the multiple subject matters based on the display structure; and performing video editing processing on the multiple subject matters according to the display order, and adding transition special effects between adjacent subject matters in the multiple subject matters to generate the target video.

In the embodiments of the present disclosure, the non-volatile storage medium is configured to store program codes for performing the following steps: obtaining multiple promotional original files, wherein each of the multiple promotional original files includes: at least one promotional subject matter; extracting multiple promotional subject matters and labeling information corresponding to the multiple promotional subject matters from the multiple promotional original files; establishing a display structure corresponding to the multiple promotional subject matters based on the labeling information; and combining the multiple promotional subject matters using the display structure to generate a promotional video.

The serial numbers of the foregoing embodiments of the present disclosure are only used for description, and do not represent the superiority or inferiority of the embodiments.

In the foregoing embodiments of the present disclosure, a description of each embodiment has its own focus. For parts that are not described in detail in an embodiment, reference may be made to related descriptions of other embodiments.

In the embodiments provided in the present disclosure, it should be understood that the disclosed technical content can be implemented in other ways. The apparatus embodiments described above are merely illustrative. For example, a division of units is only a division of logical functions. In practical implementations, other methods of division may exist. For example, multiple units or components may be combined or may be integrated into another system, or some features may be ignored or not be implemented. In addition, displayed or discussed mutual coupling or direct coupling or communication connection may be indirect coupling or communication connection through some interfaces, units or modules, and may be in electrical or other forms.

The units described as separate components may or may not be physically separated. The components displayed as units may or may not be physical units, i.e., may be located in a single place, or may be distributed on multiple network units. Some or all of the units may be selected according to actual needs to achieve the objectives of the solutions of the embodiments.

In addition, the functional units in various embodiments of the present disclosure may be integrated into a single processing unit. Alternatively, each unit may exist to be physically independent. Alternatively, two or more units may be integrated into a single unit. The above-mentioned integrated unit can be implemented in a form of hardware or software functional unit.

If being implemented in a form of a software functional unit and sold or used as an independent product, the integrated unit can be stored in a computer readable non-volatile storage medium. Based on such understanding, the essence of the technical solutions of the present disclosure, the parts that contribute to the existing technologies, or all or part of the technical solutions can be embodied in a form of a software product. Such computer software product is stored in a storage medium, which includes a number of instructions to make a computer device (which may be a personal computer, a server, or a network device, etc.) to execute all or part of the steps of the methods described in each embodiment of the present disclosure. The storage media include various types of media that are capable to store program codes, such as a U disk, a read-only memory (ROM), a random access memory (RAM), a portable hard disk, a magnetic disk, or an optical disk, etc.

The above are only exemplary embodiments of the present disclosure. It should be pointed out that one of ordinary skill in the art can make a number of improvements and modifications, without departing from the principles of the present disclosure. These improvements and modifications should also fall in the scope of protection of the present disclosure.

The present disclosure can be further understood using the following clauses.

Clause 1: A video generation method comprising: obtaining multiple original files, each of the multiple original files includes at least one subject matter; extracting multiple subject matters and labeling information corresponding to the multiple subject matters from the multiple original files; establishing a display structure corresponding to the multiple subject matters based on the labeling information; and combining the multiple subject matters using the display structure to generate a target video.

Clause 2: The video generation method according to Clause 1, wherein extracting the multiple subject matters from the multiple original files comprises: using a region of interest recognition method to detect a picture block in the multiple original files to obtain a picture subject matter; using an optical character recognition method to detect a text block in the multiple original files and using layout rules of the text block to obtain a text subject matter; and combining the picture block and the text block to obtain a picture-text subject matter based on the layout rules.

Clause 3: The video generation method according to Clause 2, wherein combining the picture block and the text block to obtain the picture-text subject matter based on the layout rules comprises: combining the picture block and the text block into the picture-text subject matter when the text block is located in a first preset area inside the picture block and a proportion of an inside part of the picture block that the text block accounts for is greater than a first preset threshold; and combining the picture block and the text block into the picture-text subject matter when the text block is located in a second preset area outside the picture block and a distance between the text block and the picture block is less than a second preset threshold.

Clause 4: The video generation method according to Clause 1, wherein extracting the labeling information corresponding to the multiple subject matters from the multiple original files comprises: extracting the labeling information corresponding to the multiple subject matters from the multiple original files using a first target neural network model.

Clause 5: The video generation method according to Clause 4, further comprising: constructing a training data set, wherein the training data set includes: first label data and second label data, the first label data being label data obtained by machine learning, and the second label data being label data obtained by a manual labeling method; and training an initial neural network model using the training data set to obtain the first target neural network model, wherein the initial neural network model is a network model obtained by pre-training using an initial data set.

Clause 6: The video generation method according to Clause 5, wherein training the initial neural network model using the training data set to obtain the first target neural network model comprises: performing first fine-tuning training on the initial neural network model using the first label data to obtain an intermediate neural network model; and performing a second fine-tuning training on the intermediate neural network model using the second label data to obtain the first target neural network model.

Clause 7: The video generation method according to Clause 1, wherein establishing the display structure corresponding to the multiple subject matters based on the labeling information comprises: establishing the display structure corresponding to the multiple subject matters based on the labeling information and a second target neural network model.

Clause 8: The video generation method according to Clause 7, wherein establishing the display structure corresponding to the multiple subject matters based on the labeling information and the second target neural network model comprises: performing clustering processing on the multiple subject matters based on the labeling information and the second target neural network model to obtain multiple subject matter sub-categories; and performing ordering determination on each of the multiple subject matter sub-categories to obtain the display structure.

Clause 9: The video generation method according to Clause 8, wherein the second target neural network model is a clustering model obtained after joint training using a reconstruction loss, a clustering loss and a classification loss, the reconstruction loss is a loss calculated and obtained by encoding the multiple subject matters and constructing hidden layer features, the clustering loss is a loss calculated and obtained by using the hidden layer features for subject matter clustering, and the classification loss is a loss calculated and obtained by encoding the multiple subject matters and aligning respective coding of different types of subject matters.

Clause 10: The video generation method according to Clause 1, wherein combining the multiple subject matters using the display structure to generate the target video comprises: determining a display order of the multiple subject matters based on the display structure; and performing video editing processing on the multiple subject matters according to the display order, and adding transition special effects between adjacent subject matters in the multiple subject matters to generate the target video.

Clause 11: A promotional video generation method comprising: obtaining multiple promotional original files, wherein each of the multiple promotional original files includes: at least one promotional subject matter; extracting multiple promotional subject matters and labeling information corresponding to the multiple promotional subject matters from the multiple promotional original files; establishing a display structure corresponding to the multiple promotional subject matters based on the labeling information; and combining the multiple promotional subject matters using the display structure to generate a promotional video.

Clause 12: A video generation apparatus comprising: an acquisition module configured to obtain a plurality of original files, each of the plurality of original files includes at least one subject matter; an extraction module configured to extract multiple subject matters and labeling information corresponding to the multiple subject matters from the plurality of original files; an establishing module configured to a display structure corresponding to the multiple subject matters based on the labeling information; and a generation module configured to the multiple subject matters using the display structure to generate a target video.

Clause 13: A promotional type video generation apparatus comprising: an acquisition unit configured to obtain a plurality of promotional original files, wherein each of the plurality of promotional original files includes: at least one promotional subject matter; an extraction unit configured to extract multiple promotional subject matters and labeling information corresponding to the multiple promotional subject matters from the plurality of promotional original files; an establishing unit configured to establish a display structure corresponding to the multiple promotional subject matters based on the labeling information; and a generation unit configured to combine the multiple promotional subject matters using the display structure to generate a promotional video.

Clause 14: A non-volatile storage medium comprising a stored program, wherein the program when running, control a device where the non-volatile storage medium is located to execute the video generation method according to any one of Clauses 1-10, and the promotional video generation method according to Clause 11.

Clause 15: An electronic device comprising: a processor; and a memory connected to the processor, and configured to provide the processor with instructions for processing the following processing steps: obtaining multiple original files, each of the multiple original files includes at least one subject matter; extracting multiple subject matters and labeling information corresponding to the multiple subject matters from the multiple original files; establishing a display structure corresponding to the multiple subject matters based on the labeling information; and combining the multiple subject matters using the display structure to generate a target video.

What is claimed is:
1. A method comprising:
generating, by a computing device, a target video from multiple original files, the multiple original files including at least picture files and text files, the generating comprising:
  obtaining, by the computing device, the multiple original files, each of the multiple original files including at least one subject matter;
  extracting, by the computing device, multiple subject matters and labeling information corresponding to the multiple subject matters from the multiple original files, wherein extracting the labeling information corresponding to the multiple subject matters from the multiple original files comprises: extracting the labeling information corresponding to the multiple subject matters from the multiple original files using a first target neural network model, and wherein extracting the multiple subject matters from the multiple original files comprises:
  combining, by the computing device, a picture block and a text block based on layout rules, wherein combining the picture block and the text block based on layout rules comprises:
    combining, by the computing device, the picture block and the text block into a picture-text subject matter when the text block is located in a first preset area inside the picture block and a proportion of an inside part of the picture block that the text block accounts for is greater than a first preset threshold;
    combining, by the computing device, the picture block and the text block into the picture-text subject matter when the text block is located in a second preset area outside the picture block and a distance between the text block and the picture block is less than a second preset threshold;

ignoring, by the computing device, a text in the picture block if the text block accounts for less than a third preset percentage of an image in the picture block; and ignoring, by the computing device, the image in the picture block if the text block accounts for greater than a fourth preset percentage of the image;

determining, by the computing device, a display order of each subject matter of the multiple subject matters based at least in part on the labeling information;

establishing, by the computing device, a display structure corresponding to the multiple subject matters based on the labeling information, the display structure including a graph structure having hierarchical and ordering information for text and picture reconstruction, wherein establishing the display structure corresponding to the multiple subject matters based on the labeling information comprises:

establishing the display structure corresponding to the multiple subject matters based on the labeling information and a second target neural network model, wherein establishing the display structure corresponding to the multiple subject matters based on the labeling information and the second target neural network model comprises:

performing clustering processing on the multiple subject matters based on the labeling information and the second target neural network model to obtain multiple subject matter sub-categories; and performing ordering determination on each of the multiple subject matter sub-categories to obtain the display structure; and combining, by the computing device, the multiple subject matters using the display structure to generate the target video.

2. The method according to claim 1, wherein extracting the multiple subject matters from the multiple original files further comprises:

using a region of interest recognition method to detect the picture block in the multiple original files to obtain a picture subject matter; and using an optical character recognition method to detect the text block in the multiple original files and using layout rules of the text block to obtain a text subject matter.

3. The method according to claim 1, further comprising:

constructing a training data set, wherein the training data set includes: first label data and second label data, the first label data being label data obtained by machine learning, and the second label data being label data obtained by a manual labeling method; and training an initial neural network model using the training data set to obtain the first target neural network model, wherein the initial neural network model is a network model obtained by pre-training using an initial data set.

4. The method according to claim 3, wherein training the initial neural network model using the training data set to obtain the first target neural network model comprises:

performing a first fine-tuning training on the initial neural network model using the first label data to obtain an intermediate neural network model; and performing a second fine-tuning training on the intermediate neural network model using the second label data to obtain the first target neural network model.

5. The method according to claim 1, wherein the second target neural network model is a clustering model obtained after joint training using a reconstruction loss, a clustering loss and a classification loss, the reconstruction loss is a loss calculated and obtained by encoding the multiple subject matters and constructing hidden layer features, the clustering loss is a loss calculated and obtained by using the hidden layer features for subject matter clustering, and the classification loss is a loss calculated and obtained by encoding the multiple subject matters and aligning respective coding of different types of subject matters.

6. The method according to claim 1, wherein combining the multiple subject matters using the display structure to generate the target video comprises:

performing video editing processing on the multiple subject matters according to the display order, and adding transition special effects between adjacent subject matters in the multiple subject matters to generate the target video.

7. One or more computer readable media storing executable instructions that, when executed by one or more processors, cause the one or more processors to perform acts comprising:

generating a target video from multiple original files, the multiple original files including at least picture files and text files, the generating comprising:

obtaining the multiple original files, each of the multiple original files including at least one subject matter;

extracting multiple subject matters and labeling information corresponding to the multiple subject matters from the multiple original files, wherein extracting the labeling information corresponding to the multiple subject matters from the multiple original files comprises: extracting the labeling information corresponding to the multiple subject matters from the multiple original files using a first target neural network model, and wherein extracting the multiple subject matters from the multiple original files comprises:

combining a picture block and a text block based on layout rules, wherein combining the picture block and the text block based on layout rules comprises:

combining the picture block and the text block into a picture-text subject matter when the text block is located in a first preset area inside the picture block and a proportion of an inside part of the picture block that the text block accounts for is greater than a first preset threshold;

combining the picture block and the text block into the picture-text subject matter when the text block is located in a second preset area outside the picture block and a distance between the text block and the picture block is less than a second preset threshold;

ignoring a text in the picture block if the text block accounts for less than a third preset percentage of an image in the picture block; and ignoring the image in the picture block if the text block accounts for greater than a fourth preset percentage of the image;

determining a display order of each subject matter of the multiple subject matters based at least in part on the labeling information;

establishing a display structure corresponding to the multiple subject matters based on the labeling information, the display structure including a graph structure having hierarchical and ordering information for text and picture reconstruction, wherein establishing the display structure corresponding to the multiple subject matters based on the labeling information comprises:

establishing the display structure corresponding to the multiple subject matters based on the labeling information and a second target neural network model, wherein establishing the display structure corresponding to the multiple subject matters based on the labeling information and the second target neural network model comprises:

performing clustering processing on the multiple subject matters based on the labeling information and the second target neural network model to obtain multiple subject matter sub-categories; and performing ordering determination on each of the multiple subject matter sub-categories to obtain the display structure; and combining the multiple subject matters using the display structure to generate the target video.

8. The one or more computer readable media according to claim 7, wherein extracting the multiple subject matters from the multiple original files comprises:

using a region of interest recognition method to detect the picture block in the multiple original files to obtain a picture subject matter; and using an optical character recognition method to detect the text block in the multiple original files and using layout rules of the text block to obtain a text subject matter.

9. The one or more computer readable media according to claim 7, the acts further comprising:

constructing a training data set, wherein the training data set includes: first label data and second label data, the first label data being label data obtained by machine learning, and the second label data being label data obtained by a manual labeling method; and training an initial neural network model using the training data set to obtain the first target neural network model, wherein the initial neural network model is a network model obtained by pre-training using an initial data set.

10. The one or more computer readable media according to claim 9, wherein training the initial neural network model using the training data set to obtain the first target neural network model comprises:

performing a first fine-tuning training on the initial neural network model using the first label data to obtain an intermediate neural network model; and performing a second fine-tuning training on the intermediate neural network model using the second label data to obtain the first target neural network model.

11. The one or more computer readable media according to claim 7, wherein combining the multiple subject matters using the display structure to generate the target video comprises:

performing video editing processing on the multiple subject matters according to the display order, and adding transition special effects between adjacent subject matters in the multiple subject matters to generate the target video.

12. An apparatus comprising:
one or more processors; and
memory storing executable instructions that, when executed by the one or more processors, cause the one or more processors to perform acts comprising:

generating a target video from multiple original files, the multiple original files including at least picture files and text files, the generating comprising:

obtaining the multiple original files, each of the multiple original files including at least one subject matter;

extracting multiple subject matters and labeling information corresponding to the multiple subject matters from the multiple original files, wherein extracting the labeling information corresponding to the multiple subject matters from the multiple original files comprises: extracting the labeling information corresponding to the multiple subject matters from the multiple original files using a first target neural network model, and wherein extracting the multiple subject matters from the multiple original files comprises:

combining a picture block and a text block based on layout rules, wherein combining the picture block and the text block based on layout rules comprises:

combining the picture block and the text block into a picture-text subject matter when the text block is located in a first preset area inside the picture block and a proportion of an inside part of the picture block that the text block accounts for is greater than a first preset threshold;

combining the picture block and the text block into the picture-text subject matter when the text block is located in a second preset area outside the picture block and a distance between the text block and the picture block is less than a second preset threshold;

ignoring a text in the picture block if the text block accounts for less than a third preset percentage of an image in the picture block; and ignoring the image in the picture block if the text block accounts for greater than a fourth preset percentage of the image;

determining a display order of each subject matter of the multiple subject matters based at least in part on the labeling information;

establishing a display structure corresponding to the multiple subject matters based on the labeling information, the display structure including a graph structure having hierarchical and ordering information for text and picture reconstruction, wherein establishing the display structure corresponding to the multiple subject matters based on the labeling information comprises:

establishing the display structure corresponding to the multiple subject matters based on the labeling information and a second target neural network model, wherein establishing the display structure corresponding to the multiple subject matters based on the labeling information and the second target neural network model comprises:

performing clustering processing on the multiple subject matters based on the labeling information and the second target neural network model to obtain multiple subject matter sub-categories; and performing ordering determination on each of the multiple subject matter sub-categories to obtain the display structure; and combining the multiple subject matters using the display structure to generate the target video.

\* \* \* \* \*